April 3, 1956 L. R. GOLLADAY 2,740,890
SWITCHING AND CONTROL MEANS FOR CARRIER CURRENT TRANSMITTERS
Filed Oct. 25, 1951
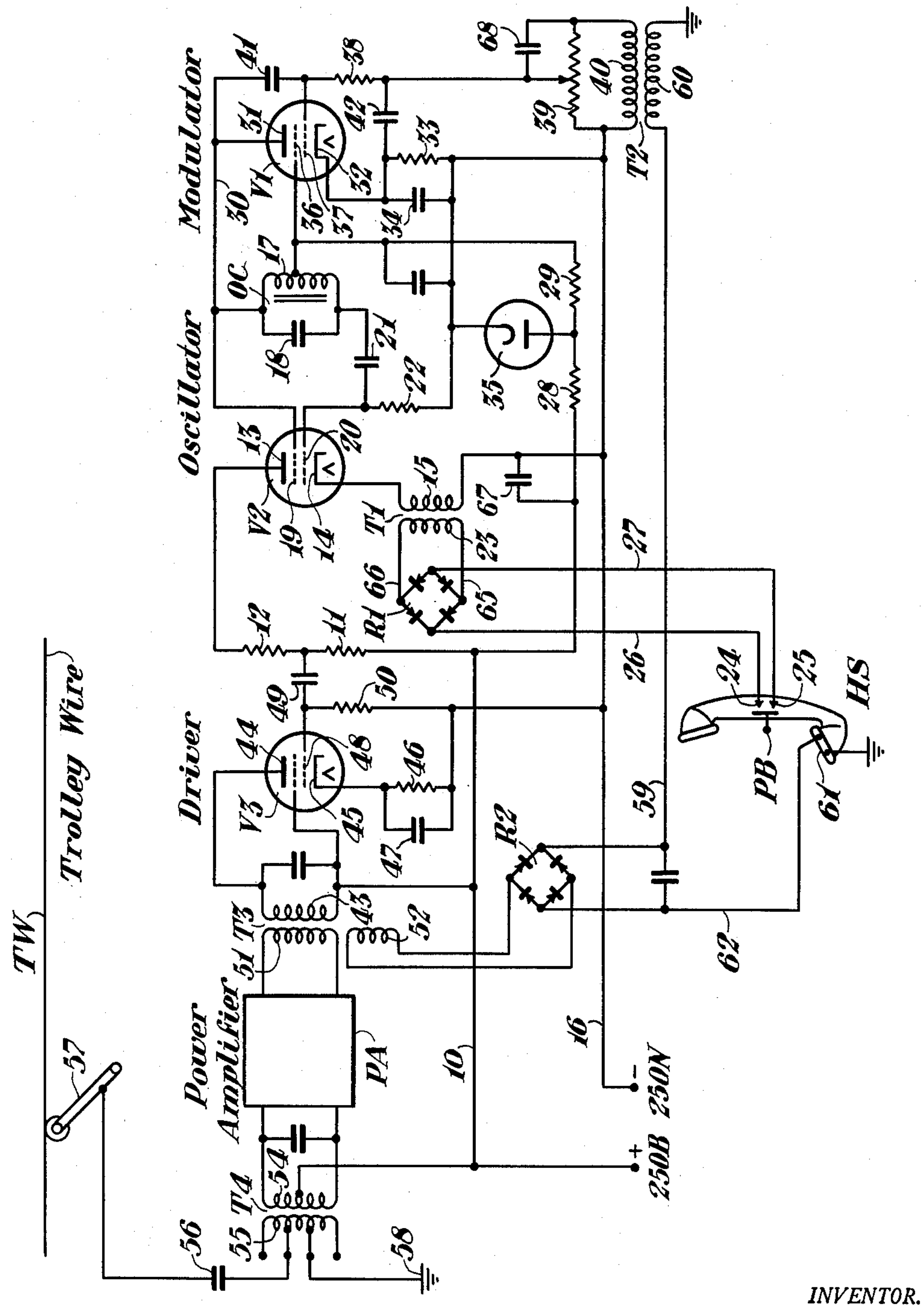
INVENTOR.
Lawrence R. Golladay
BY
W. L. Stout.
HIS ATTORNEY United States Patent Office 2,740,890

Patented Apr. 3, 1956

2,740,890

SWITCHING AND CONTROL MEANS FOR CARRIER CURRENT TRANSMITTERS

Lawrence R. Golladay, Forest Hills, Pa., assignor to Westinghouse Air Brake Company, Wilmerding, Pa., a corporation of Pennsylvania Application October 25, 1951, Serial No. 253,190

6 Claims. (Cl. 250—36)

My invention relates to switching and control means for carrier current transmitters, and more particularly to switching and control means for transmitters of carrier signaling and communication systems.

Carrier transmitters of the type here contemplated include an oscillator adapted to supply a carrier of a selected frequency and means to control and/or modulate the carrier. In simplex types of carrier communication systems, such as those commonly provided for railway trains and other mobile units, the transmitter of each station is inactive during noncommunication periods and during receiving periods and is switched to an active condition only during sending periods of the station at which the transmitter is located. This requires that the transmitter and receiver of a station be switched between active and inactive conditions according as the operator wishes to send or receive. Frequently the transmitter includes a key or switching means whereby the carrier can be coded by interrupting the carrier according to a code pattern, and such codes used for signaling. When the carrier is to be modulated for communication purposes, the control includes an audible frequency source which is coupled to the oscillator through a modulator. Again, in carrier communication systems for electric railways, the communication equipment is preferably powered from the propulsion current system which is usually of a relatively high voltage, a voltage sufficiently high to be dangerous to anyone coming in contact therewith. In such communication systems for electric railways the different control circuits of the communication equipment are usually connected to the trolley wire or third rail through a resistance network which reduces the high voltage of the propulsion current to different voltages suitable for the different elements of the communication equipment. In such an arrangement a broken circuit connection may cause the high potential of the trolley wire and third rail with respect to ground to be present in the circuit on the side away from the break and this may be dangerous to the operator who handles the equipment.

Furthermore, when keying and switching means are provided in the output side of an oscillator of a carrier current transmitter, the distributed electrical coupling between the conductors of the keying circuit and conductors on the input side of the oscillator may be sufficient that the energy transferred thereby excites the oscillator and causes the oscillator to remain active when the keying means is operated to a position for interrupting the operation of the oscillator. This feed back energy may be sufficient even to initiate operation of the oscillator. Thus, this distributed electrical coupling between the different circuit elements may cause the oscillator of the transmitter to be active regardless of the position of the keying means.

Accordingly, a feature of my invention is the provision of novel and improved switching and control means for a carrier current transmitter.

A further feature of my invention is the provision of novel and improved means for keying and modulating a carrier current transmitter wherein the electrical elements which are handled by the operator are electrically isolated from the power source so that when power is derived from a high voltage source the danger of shock to the operator is minimized.

A more specific feature of my invention is the provision of improved keying and control means for carrier current transmitters wherewith the distributed electrical coupling between circuit elements that may result in a feed back of energy that excites the oscillator and causes generation of the carrier oscillator irrespective of the keying and control means is made ineffective.

Other features, objects and advantages of my invention will be apparent as the specification progresses.

Apparatus similar to certain features of the apparatus embodying my invention is disclosed and broadly claimed in a prior copending application, Serial No. 172,560, filed July 7, 1950, by Ralph K. Crooks, for Switching and Control Means for Carrier Signaling and Communication Equipment, now Letters Patent of the United States No. 2,721,979, issued October 25, 1955, my present application being an improvement of this prior application.

The foregoing features, objects and advantages of my invention are attained by the provision of an electron tube oscillator and a switching or keying means operable to render the oscillator active or inactive. The output circuit of the oscillator tube is adapted to be powered from relatively high voltage terminals and the oscillatory circuit is coupled to the input electrodes of the tube. The parts are so proportioned and arranged that oscillations are or are not generated according as the impedance of the output circuit is less than or greater than a given value. That is, when a current of at least a given value flows in the output circuit of the oscillator tube, the oscillatory circuit is sufficiently excited to cause the generation of oscillations of the carrier frequency. When the current flowing in the output circuit is reduced to less than this given value, the excitation of the oscillatory circuit is reduced to a point where it ceases to generate the oscillations. The keying means includes a transformer having independant primary and secondary windings, a rectifier having input and output terminals and a switch operable to a closed and an open position. The primary winding is interposed in series in the output circuit of the oscillator tube and functions as an impedance element therefor. When the primary winding presents an impedance at the carrier frequency sufficiently high to reduce the current flowing in the output circuit to a value less than the critical given value, the generation of the oscillations is suppressed, but when the primary winding presents an impedance that permits the current flowing in the output circuit to be greater than this critical value, the oscillations are generated. The secondary winding of the transformer is provided with connections to connect the winding across the input terminals of the rectifier and the switch is provided with connections for connecting the switch across the output terminals of the rectifier. Thus, the secondary winding is substantially short circuited and the transformer loaded and the primary winding of low impedance when the switch is closed and the secondary winding is open circuited and the transformer without a load so that the primary winding presents a high impedance when the switch is open. The connections provided for the secondary winding to the input terminals of the rectifier carry alternating current and these connections are made short by locating the rectifier adjacent the transformer so that unwanted excitation of the oscillatory circuit due to electrostatic coupling between the connection of the secondary winding and the oscillatory circuit is small and can be neglected. The connection provided for the switch carries direct current and hence the switch can be placed where it is convenient for the operator even through the lead wires for this connection are of some length. Since these lead wires carry a direct current there is substantially no excitation of the oscillatory circuit due to any distributed electrical coupling between these lead wires and the conductors of the oscillatory circuit.

By providing the transformer with independent primary and secondary windings, and by providing a rectifier between the secondary winding and the switch, the switch which is handled by the operator is substantially electrically isolated from the power source so that the danger of shock to the operator is reduced to a minimum even when the power source is a high voltage propulsion current source such as used on electric railways.

When the carrier current of the transmitter is to be modulated for communication purposes by means of a microphone I preferably energize the microphone circuit through a circuit which is energized by energy derived from the output of the oscillator. To this end, a coupling transformer ahead of the power amplifier of the transmitter is provided with a secondary winding which is connected to a rectifier and the output of this rectifier is used for energizing a microphone circuit, the microphone circuit being in turn coupled to the oscillator of the transmitter through a suitable modulator.

I shall describe one form of switching and control means for carrier current transmitters embodying my invention and shall then point out the novel features thereof in claims.

The accompanying drawing is a diagrammatic view showing one form of apparatus embodying my invention when used with a carrier current transmitter of a carrier telephone system for electric railways, the transmitter being that provided for a vehicle carried equipment of the system.

It is to be understood that the invention is not limited to this one use shown in the drawing and this showing is by way of illustrating the apparatus and there are other places where the invention is useful.

Referring to the drawing, the transmitter apparatus comprises an oscillator including an electron tube V2 and an oscillatory circuit OC, a modulator V1, a driver tube V3 and a power amplifier PA; a keying means including a transformer T1, a rectifier R1, and a push button PB; a microphone circuit and a source of power.

Power for this transmitter apparatus is obtained from the propulsion current system which includes a trolley wire TW and the track rails (not shown) of the electric railway over which the vehicles on which the apparatus is mounted move. The high voltage of the propulsion current system may be of the order of 500 to 600 direct volts or even higher, and voltages proper for the carrier transmitter here involved would be derived preferably through a suitable resistance network, not shown. For example, the resistance network for providing suitable voltages for the carrier transmitter may be that shown in a copending application for Letters Patent of the United States, Serial No. 51,578, filed September 28, 1948, by Edgar W. Breisch, for Power Supply Circuits, now abandoned. It is sufficient for the present application to point out that a direct voltage of the order of 250 volts is provided between a positive terminal 250B and a negative terminal 250N through a resistance network connected between the trolley wire TW and the frame of the vehicle on which the apparatus is mounted. In addition to this 250 volts thus provided, a suitable low voltage of the order of, say 7.5 volts for the heater circuits of the different tubes of the apparatus is provided, and the tubes are heated ready for operation. These heater circuits are not shown since they would be in accordance with standard practice and form no part of my present invention.

It is also to be explained that in carrier communication systems for electric railways, the transmitting circuit for the system frequently includes the trolley wire as one side of the circuit and the track rails in multiple and the ground path as the other side of the circuit. In the present drawing it is contemplated that the transmitting circuit includes the trolley wire TW and the rails, but it is apparent that the transmitting circuit can be of some other form or medium.

The electron tubes V1, V2 and V3 here provided are tetrodes, each having an anode, a cathode and a first and a second control grid or electrode, but other types of tubes can be used.

Referring first to the electron tube V2 which is a part of the oscillator of the transmitter, this tube is provided with an anode-cathode circuit which is the output circuit of the oscillator and which circuit extends from the positive terminal 250B through positive bus wire 10, resistors 11 and 12 in series, anode 13 and tube space to cathode 14 of tube V2, winding 15 of a transformer T1 to be referred to hereinafter, and a negative bus wire 16 to the negative terminal 250N. Preferably, a by-pass capacitor 67 is connected between wires 10 and 16. Thus, the oscillator tube V2 is normally supplied with power derived from the trolley wire through a suitable resistance network. The magnitude or the value of the current that flows in this anode-cathode circuit of tube V2 is governed in part by the impedance of the winding 15 of transformer T1, as will be explained shortly.

The oscillatory circuit OC of the oscillator comprises an inductor winding 17 and a capacitor 18 in multiple and as here shown this oscillatory circuit is connected to the two control grids 19 and 20 of tube V2 through a coupling capacitor 21, the grid 20 being provided with a grid leak resistor 22. The parts are so proportioned that the oscillatory circuit OC is tuned to resonance at a selected carrier frequency and as an aid to the understanding of the invention I shall assume that it is tuned to resonance at the frequency of 88 kc. but it is clear that other carrier frequenciees can be used. The parts are further so proportioned that the oscillatory circuit is excited and oscillations of the carrier frequency are generated when current of at least a given value flows in the anode-cathode circuit of the tube V2 and which value of the current flows when the winding 15 of the transformer T1 presents an impedance at the carrier frequency of a selected given value or less. When the winding 15 presents an impedance of a value greater than the selected given value and the current flowing in the anode-cathode circuit is less than the selected critical value, the generation of the oscillations of the carrier frequency ceases.

It follows from the foregoing that by controlling the impedance of the winding 15 of transformer T1 interposed in the output circuit of the oscillator, the generating of the carrier current can be started or stopped according as the winding 15 is made of high or low impedance. In other words, the carrier transmitter can be keyed to an active or inactive condition by controlling the impedance of the winding 15 of the transformer T1.

According to my invention, the impedance of the winding 15 of transformer T1 is governed by controlling the load condition of the transformer, and this load condition is controlled through a rectifier R1 and a push-to-talk switch or button PB of the usual telephone hand set HS. The rectifier R1 is preferably a bridge type dry surface contact or crystal form of rectifier having input and output terminals. The secondary winding 23 of the transformer T1 is provided with connections including lead wires 65 and 66 by which the winding is connected across the input or alternating current terminals of the rectifier R1. The direct current or output terminals of the rectifier R1 are connected to the contact 24 and 25 of the push button PB through a connection which includes a pair of lead wires 26 and 27. Thus when the push button PB is open there is substantially no load on the transformer and the primary winding 15 presents a relatively high impedance at the carrier frequency, an impedance higher than a selected given value. When the push button PB is closed, the secondary winding 23 is substantially short circuited through the rectifier and the transformer is provided with a load and the primary winding 15 presents a relatively low impedance in the anode circuit of the oscillator tube V2, the impedance being less than the given value.

It follows from the foregoing that the oscillator comprising tube V2 and oscillatory circuit OC is inactive to generate carrier current when the push button PB is open and is made active to generate the carrier current when the push button is closed.

The rectifier R1 is mounted relatively close to the transformer T1 so that the connections including the lead wires 65 and 66 which carry alternating current to the input terminals of the rectifier are relatively short and there is little or no electrical coupling between these short lead wires and the circuit elements on the input side of the oscillator tube V2. At least the feed back energy caused by the electrical coupling between these short lead wires 65 and 66 and the conductors of the oscillatory circuit is not sufficient to excite the oscillator to a point where it will generate the carrier current. Again, the connection including the lead wires 26 and 27 between the switch PB and the output terminals of the rectifier R1 carry direct current and substantially no energy is transferred from this connection to the oscillatory circuit due to any distributed electrical coupling between these lead wires and the input side of the electron tube V2. Thus, the switch or push button PB can be located some distance away if desirable and at a point where it is convenient for the operator without any unwanted exciting of the oscillator due to distributed electrical coupling between the lead wires to the switch PB and the input side of the oscillator.

Furthermore, this arrangement of the keying means using a transformer having independent primary and secondary windings and a rectifier, completely isolates the push-button from the high voltage power source used for the transmitter and the possibility of shock to the operator in handling the switch PB is substantially avoided.

The carrier current of the transmitter is further controlled by being modulated at voice frequencies, this modulation being effected through a microphone of the hand set HS and the modulator tube V1. The modulator tube V1 is coupled to the oscillatory circuit OC in such a manner as to vary the tuning of that circuit. The tube V1 is provided with an anode circuit which extends from terminal 250B through positive bus wire 10, resistors 28 and 29, a portion of the inductor winding 17 of the oscillatory circuit, wire 30, anode 31 and tube space to cathode 32 of tube V1, a biasing unit consisting of a resistor 33 and a capacitor 34 in multiple, and the negative bus wire 16 to the negative terminal 250N. Preferably, a voltage limiter tube 35 is connected between the junction terminals of resistors 28 and 29 and the negative return wire 16. Since the grid 20 of tube V2 is connected to one terminal of the oscillatory circuit by capacitor 21 and is connected to the negative return wire 16 through grid leak resistor 22, and the control grid 19 of the tube V2 is connected directly to the terminal of the oscillatory circuit that is connected to the anode 31 of tube V1, it is to be seen that the tube V1 is in multiple with the oscillatory circuit OC and a variation of the impedance of the tube V1 will cause a change in the tuning of the oscillatory circuit and thus change the frequency of the oscillations created by the oscillator.

A control grid 36 of tube V1 is connected to the positive terminal 250B through the resistors 28 and 29 and the other control grid 37 of the tube V1 is provided with a circuit which includes a resistor 38, a selected portion of a resistor 39 connected across the secondary winding 40 of a transformer T2, the biasing unit 33—34 and cathode 32 of the tube. Preferably, a capacitor 68 is connected across resistor 39. Also, a capacitor 41 is connected between the anode 31 and grid 37 and a by-pass capacitor 42 is connected across grid 37 and cathode 32. Hence, a voltage induced in winding 40 of the transformer T2 is applied to grid 37 of the tube V1 to vary the impedance of the tube and in turn vary the tuning of the oscillatory circuit OC and thereby frequency modulate the carrier current.

Voice frequencies are applied to the tube V1 through a microphone circuit which derives power from the output of the oscillator, power being derived from a coupling transformer T3, between the driver tube V3 and the power amplifier PA. The tube V3 is provided with an anode circuit which includes positive terminal 250B, wire 10, primary winding 43 of coupling transformer T3, anode 44 and tube space to cathode 45 of tube V3, a biasing unit comprising a resistor 46 and a capacitor 47 in multiple, negative bus wire 16, and terminal 250N. A control grid 48 of tube V3 is coupled to the anode circuit of the oscillator tube V2 through a capacitor 49 and is provided with a grid leak resistor 50. It follows, that the output of the oscillator is applied to the grid 48 of the driver tube V3 and the carrier is reproduced in the primary winding 43 of the coupling transformer T3 due to the action of the tube V3. Also, this current flowing in the primary winding 43 induces corresponding electromotive forces in the two secondary windings 51 and 52 of the transformer T3.

The portion of the output of the oscillator supplied to the auxiliary secondary winding 52 of the transformer T3 is applied to the input terminals of a bridge type rectifier R2. The output or direct current terminals of the rectifier R2 are connected to a microphone circuit which extends from one output terminal of the rectifier through wire 59, primary winding 60 of transformer T2, ground connection, microphone 61 of the hand set HS and wire 62 to the other output terminal of the rectifier R2. It follows that when the push button PB is pressed to activate the oscillator of the transmitter in the manner explained hereinbefore, a portion of the carrier is supplied to the auxiliary secondary winding 52, rectified at the rectifier R2 and the rectified current used to energize the microphone circuit with the result that voice frequencies created by the operator speaking into the microphone 61 serve to frequency modulate the carrier.

It is to be seen from the foregoing that with this arrangement for powering the microphone circuit, the microphone which is used by the operator is substantially electrically isolated from the high voltage power source and danger of shock to the operator is minimized.

The portion of the output of the driver tube supplied to the secondary winding 51 of transformer T3 is applied to the input of the power amplifier PA and amplified to a relatively high energy level and supplied to the primary winding 54 of an output transformer T4, a secondary winding 55 of which transformer has one terminal connected to the trolley wire TW through a blocking capacitor 56 and the trolley pole and wheel 57 of the vehicle and its other terminal connected to the rails through the frame of the vehicle by a connection to a ground electrode 58. The power amplifier PA is shown in block form since it can be of any one of several well known arrangements and its specific structure forms no part of my invention.

Control and keying apparatus here provided has the advantages that the keying switch or push button and the microphone of the hand set which the operator uses in keying and signaling are substantially electrically isolated from the power source and the danger of shock to the operator due to the high voltage of the power source is minimized. Furthermore, the lead wires 26 and 27 of the keying means which are of some length and may possess some distributed electrical coupling to the conductors of the oscillator are made to carry direct current and feed back energy that might cause unwanted operation of the oscillator is substantially avoided. Thus, with the keying means here provided, the possibility of the oscillator failing to revert to its inactive condition when the keying means is moved to its inactive position due to feed back energy falsely exciting the oscillator is avoided. Furthermore, there is little or no possibility fo the oscillator being initially excited to its active condition by feed back energy due to distributed electrical coupling between the conductors of the keying means and the conductors of the oscillator. In other words, the keying means here provided include circuits which are insensitive to a wide variation in the inherent circuit capacitance.

Although I have herein shown and described but one form of switching and control means for carrier current transmitters embodying my invention, it is understood that various changes and modifications may be made therein within the scope of the appended claims without departing from the spirit and scope of my invention.

Having thus described my invention, what I claim is:

1. In a carrier current transmitter having an oscillator for generating a carrier of a selected frequency and keying means operable to control the oscillator to an active or inactive condition, the combination comprising; an oscillator including an electron tube having an anode, a cathode and a control grid and an oscillatory circuit having an inductor and a capacitor tuned to resonance at a selected frequency; said tube provided with an anode circuit connected across said anode and cathode and including a power source, said oscillatory circuit provided with coupling means to couple that circuit to said control grid, said oscillatory circuit being excited through said coupling means to create or not to create oscillations of said selected frequency according as said anode circuit has an impedance less than or greater than a given value at said frequency; keying means including a transformer having a primary and a secondary winding, a rectifier having input and output terminals and a switch operable to a closed and an open position; said primary winding interposed in said anode circuit adjacent said cathode and adapted to cause the anode circuit to have an impedance less than or greater than said given value according as said transformer is or is not loaded; said secondary winding having connections to connect that winding across said input terminals of said rectifier and said switch having connections to connect the switch across said output terminals of said rectifier, said transformer being loaded when said switch is closed to short circuit said secondary winding through said connections, said connections of said secondary winding being made relatively short and said connections of said switch being made of a length suitable to conveniently locate the switch to avoid unwanted excitation of said oscillatory circuit due to distributed electrical coupling between the keying means and the oscillatory circuit.

2. In a carrier current transmitter having an oscillator for generating a carrier of a selected frequency and keying means operable to control the oscillator to an active or inactive condition, the combination comprising; an oscillator including an electron tube having an anode, a cathode and a control grid and an oscillatory circuit having an inductor and a capacitor tuned to resonance at a selected frequency; said tube provided with an anode circuit connected across said anode and cathode and including a power source, said oscillatory circuit provided with coupling means to couple that circuit to said control grid, said oscillatory circuit being excited through said coupling means to create or not to create oscillations of said selected frequency according as said anode circuit has an impedance less than or greater than a given value at said frequency; keying means including a transformer having a primary and a secondary winding, a rectifier having input and output terminals and a manually operable switching key having a closed and an open position; said primary winding interposed in said anode circuit adjacent said cathode and adapted to cause the impedance of said anode circuit to be less than or greater than said given value according as the primary winding is or is not loaded, a first pair of connecting leads to connect said secondary winding across said input terminals, a second pair of connecting leads to connect said key across said output terminals, said secondary winding being substantially short-circuited and said primary winding loaded when said key is closed and the secondary winding being substantially open-circuited and the primary winding without load when the key is open, said first pair of connecting leads being relatively short and said second pair of connecting leads being of greater length to permit the key to be located as required for convenient operation thereof to avoid undesired excitation of said oscillatory circuit due to electrostatic coupling between said first and second pairs of connecting leads and said oscillatory circuit to cause unwanted generation of said oscillations.

3. In a carrier current transmitter having an oscillator for generating a carrier of a selected frequency and keying means operable to control the oscillator to an active or inactive condition, the combination comprising; an oscillator including an electron tube having an anode, a cathode and a control grid and an oscillatory circuit having an inductor and a capacitor tuned to resonance at a selected frequency; said tube provided with an anode circuit connected across said anode and cathode and including a power source, said oscillatory circuit provided with coupling means to couple that circuit to said control grid, said oscillatory circuit being excited through said coupling means to create or not to create oscillations of said selected frequency according as said anode circuit has an impedance less than or greater than a given value at said frequency; keying means including a transformer having a primary and a secondary winding, a rectifier having input and output terminals and a switch operable to a closed and an open position; said primary winding interposed in said anode circuit adjacent said cathode and adapted to cause the anode circuit to have an impedance less than or greater than said given value according as said transformer is or is not loaded; a first pair of lead wires to connect said secondary winding across said input terminals of said rectifier, a second pair of lead wires to connect said switch across said output terminals of said rectifier, said transformer being loaded when said switch is closed to short-circuit said secondary winding through said first and said second pair of lead wires and said rectifier, said first pair of lead wires being made relatively short by locating the rectifier adjacent the transformer to avoid exciting the oscillator by energy transferred due to distributed electrical coupling between the lead wires of the keying means and circuit elements of the oscillator and said second pair of lead wires being made of a length sufficient to conveniently locate said switch.

4. In a transmitter for a carrier communication system for an electric railway when the communication equipment is powered from the propulsion current system and is operated on a push-to-talk basis, the combination comprising, an oscillator including an electron tube having input and output electrodes and an oscillatory circuit having inductance and capacitance tuned to resonance at a selected carrier frequency, an output circuit for said oscillator connected to said output electrodes of said tube and including relatively high voltage power terminals, an input circuit for said tube connected to said input terminals and including a circuit portion adjacent one terminal in common with said output circuit, means to couple said oscillatory circuit to said input terminals of said tube to excite the oscillatory circuit, said oscillatory circuit excited to generate or not to generate oscillations of said selected carrier frequency according as current flowing in said output circuit is greater than or less than a given value, a transformer having a primary and a secondary winding, a rectifier having input and output terminals, a push-to-talk switch, said primary winding interposed in series in said output circuit in said circuit portion in common with said input circuit, said primary winding being effective to present an impedance at said carrier frequency which causes the current flowing in said output circuit to be greater than or less than said given value according as said primary winding is or is not loaded, said secondary winding having connections across the input terminals of said rectifier and said push-to-talk switch having connections across the output terminals of said rectifier, said primary winding being loaded when the push-to-talk switch is closed to short-circuit said secondary winding through said connections, said push-to-talk switch being electrically isolated from said high voltage terminal by said transformer, and said rectifier being located adjacent said secondary winding to avoid unwanted excitation of said oscillatory circuit due to distributed electrical coupling between said connections and the oscillatory circuit.

5. In a carrier current transmitter having an oscillator for generating a carrier of a selected frequency and keying means operable to control the oscillator to an active or inactive condition, the combination comprising: an oscillator including an electron tube having an anode, a cathode, and a control grid, and an oscillatory circuit having an inductor and a capacitor in multiple tuned to resonance at a selected frequency, said tube being provided with an output circuit connected across said anode and said cathode and including a power source, said tube being further provided with an input circuit connected across said control grid and said cathode and having a circuit portion adjacent said cathode in common with said output circuit, said oscillatory circuit being coupled to said input circuit at said control grid by a coupling means, said oscillatory circuit being excited through said coupling means to create or not to create oscillations of said selected frequency according as said output circuit has an impedance less than or greater than a given value at said frequency; keying means including a transformer having a primary and a secondary winding, a rectifier having input and output terminals, and a switch operable to a closed and an open position; said primary winding being interposed in said circuit portion common to said output and said input circuits, said primary winding being effective to cause the output circuit to have an impedance less than or greater than said given value according as said transformer is or is not loaded, said secondary winding having connections across said input terminals of said rectifier and said switch having connections across said output terminals of said rectifier, said transformer being loaded when said switch is closed to short-circuit said secondary winding through said connections, said connections from said secondary winding being made relatively short to avoid unwanted excitation of said oscillatory circuit due to distributed electrical coupling between said keying means and said oscillatory circuit.

6. In a carrier current transmitter having an oscillator for generating a carrier of a selected frequency and keying means operable to control the oscillator to an active or inactive condition, the combination comprising: an oscillator including an electron tube having an anode, a cathode, a first, and a second control grid, and an oscillatory circuit having an inductor and a capacitor in multiple tuned to resonance at said selected frequency, said tube being provided with an output circuit connected across said anode and said cathode and including a high voltage power source, said tube being also provided with an input circuit connected across said cathode and said first control grid and including a circuit portion adjacent said cathode in common with said output circuit, said oscillatory circuit being connected from one terminal to said second control grid and being coupled from a second terminal to said first control grid by a coupling means, said oscillatory circuit being excited through said coupling means to generate or not to generate oscillations of said selected frequency according as the current flowing in said output circuit exceeds or is less than a given value, a transformer having a primary and a secondary winding, a rectifier having input and output terminals, a manually operated switching key having a closed and an open position, said primary winding being interposed in series in said circuit portion common to said output and said input circuits, said primary winding being effective to present an impedance at said selected frequency which causes the current in said output circuit to exceed or be less than said given value according as said primary winding is or is not loaded, said secondary winding having connections across said rectifier input terminals, said switching key having connections across said rectifier output terminals, said primary winding being loaded when said switching key is closed to short-circuit said secondary winding, said switching key being electrically isolated from said high voltage source by said transformer, and said rectifier being located immediately adjacent said secondary winding to avoid unwanted excitation of said oscillatory circuit due to distributed electrical coupling between said connections and said oscillatory circuit.

References Cited in the file of this patent

UNITED STATES PATENTS

| | | |
|---|---|---|
| 1,592,934 | Hartley | July 20, 1926 |
| 1,955,095 | Runge | Apr. 17, 1934 |
| 2,313,071 | Hodgson | Mar. 9, 1943 |
| 2,355,606 | Shannon | Aug. 15, 1944 |
| 2,435,262 | Wurmser | Feb. 3, 1948 |
| 2,579,590 | Lenehan | Dec. 25, 1951 |
| 2,617,036 | Hansen | Nov. 4, 1952 |
| 2,632,086 | Hagen | Mar. 17, 1953 |